United States Patent [19]

Strange et al.

[11] Patent Number: 4,639,828
[45] Date of Patent: Jan. 27, 1987

[54] PRESSURE SENSITIVE FAULT CURRENT INTERRUPTER FOR MULTIPLE CAPACITOR DEVICE

[75] Inventors: Thomas F. Strange; John W. Carino, both of Columbia, S.C.

[73] Assignee: North American Philips Corporation, New York, N.Y.

[21] Appl. No.: 802,783

[22] Filed: Nov. 27, 1985

[51] Int. Cl.$^4$ .............................................. H01G 1/06
[52] U.S. Cl. .................................................... 361/272
[58] Field of Search .............................. 361/327–331, 361/272, 275, 433, 15

[56] References Cited

U.S. PATENT DOCUMENTS 4,577,257  3/1986  Erhardt et al. ...................... 361/272
4,586,107  4/1986  Price .................................... 361/272

FOREIGN PATENT DOCUMENTS 2336727  2/1975  Fed. Rep. of Germany ...... 361/275

Primary Examiner—Donald A. Griffin
Attorney, Agent, or Firm—Jack E. Haken; James J. Cannon, Jr.

[57] ABSTRACT

A multisection AC capacitor having a pressure sensitive fault interrupter, said capacitor being a dry metallized AC motor start and motor run capacitor, said fault interrupter having a dome shaped diaphragm secured to one electrode at the base of one capacitor section within said unit and one or more core connectors spatially separating and securing said capacitor sections within a sleeve such that the multisection stacked capacitor may be potted within a case and gases resulting from a build up of pressure within said capacitor will be directed to its core and downward therefrom to exert pressure, causing the dome of the diaphragm to be depressed, thereby breaking the electrical contact of one electrode, thus isolating the capacitor from its power supply.

11 Claims, 1 Drawing Figure

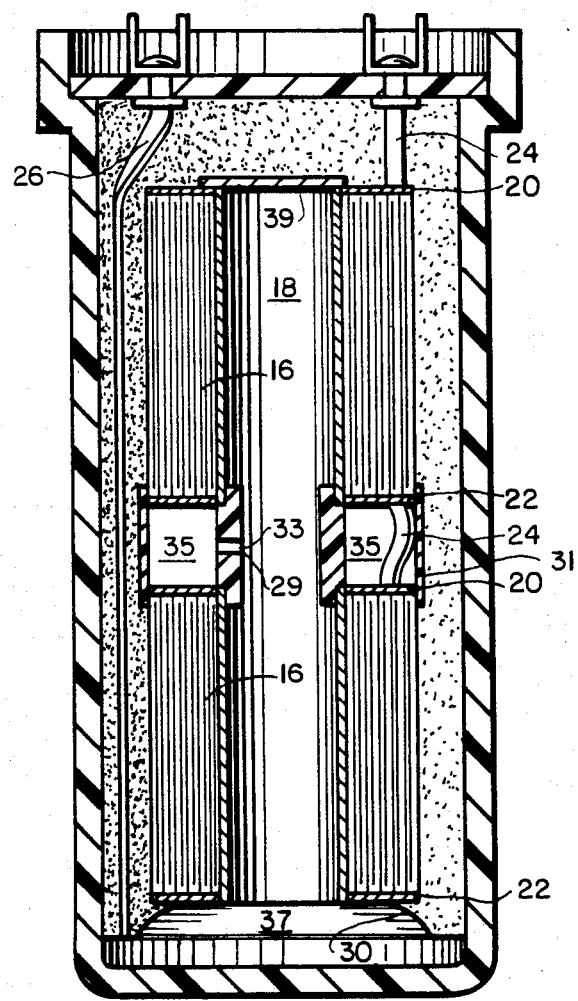

PRESSURE SENSITIVE FAULT CURRENT INTERRUPTER FOR MULTIPLE CAPACITOR DEVICE

CROSS REFERENCE TO RELATED APPLICATION

This application is related to application Ser. No. 749,615, filed June 27, 1985, for a Pressure Sensitive Fault Interrupter, Thomas F. Strange et al, inventors, assigned to the assignee of the present application.

BACKGROUND OF THE INVENTION

1. Field of the Invention

This invention pertains to the field of dry metallized film AC motor start or motor run capacitors and in particular to a multi-unit or multisection device with discrete capacitors in a stacked cell configuration with the individual capacitors connected electrically in series, said multisection device having a pressure sensitive fault interrupter.

2. Description of the Prior Art

There is virtually no known prior art either in printed literature or commercially available products in the area of drive metallized film capacitors having fault interrupters.

British Pat. No. 1,569,186 discloses a film capacitor in which a capacitor roll deforms when heated, breaking a contact. It is unclear whether a dry or wet capacitor is intended. The problem with this device is that by the time the internal temperature is high enough to deform the film roll, some other interruption would have occurred, such as an explosion.

U.S. Pat. No. 3,496,432 also pertains to a dry capacitor relying on temperature to break a contact.

U.S. Pat. No. 3,909,683 teaches a pressure sensitive fault interrupter in a dry film capacitor. It provides a yielding cavity with a fusible portion of one lead wire passing therethrough. In the event of overpressure caused by a fault, at least one contact bridge is separated. Unfortunately, gases can accumulate in the cavity and can be ignited by the breaking contact. Such a type of device tends to be unsafe for commercial use.

No dry film capacitors with fault interrupters are commercially available, indicating that the few devices disclosed in the patent literature have no commercial value, despite the proposed UL requirement in Capacitor-UL-810.

The literature on wet film capacitors with fault interrupters is extensive. Typical recent U.S. patents are U.S. Pat. Nos. 4,398,782 and 4,454,561. In particular, U.S. Pat. No. 4,398,782 is an interrupter for a wet film multisection AC capacitor in which a molded disc with ribs is utilized.

SUMMARY OF THE INVENTION

This invention pertains to a pressure sensitive fault current interrupter for a multisection capacitor device, the capacitors in the device being a dry metallized film AC motor start or motor run capacitor and all of said capacitor sections being connected in series. The purpose of the fault interrupter is to electrically isolate the multisection dry metallized film capacitor from a power source when any one of said capacitor sections has developed a complete or partial short within the windings of the capacitor itself. A pressure sensitive fault interrupter is preferred to a temperature sensitive or temperature dependent fault interrupter because when a short does occur, the pressure within the capacitor unit will rise significantly faster than the temperature. In many prior art dry film fault interrupter designs, the rapid rise in pressure will cause an explosion before a temperature sensitive interrupter is activated.

In the typical dry metallized AC motor start or motor run capacitor the ends of the capacitor roll are schooped or end sprayed with tin, zinc or another metal to form a contact bridge. In the present invention a dome-shaped diaphragm of a suitable size and material is rigidly attached to the contact bridge at one end of each capacitor section such that the pressure developed by any one capacitor section will depress its diaphragm without necessarily affecting any other capacitor section in the device. This isolates the faulty capacitor section from the power source without further damage to the multisection unit. A suitable potting agent is used to encapsulate all the capacitors and hold the roll fixed with respect to the diaphragm.

In the preferred embodiment, a stacked cell multisection capacitor configuration is utilized. Individual capacitor sections are connected electrically in series and a core connector is fashioned such that an air gap is left between the top of the uppermost capacitor and the bottom of the lowermost capacitor. Also an air gap is left between the core and the intermediate ends of all the capacitor sections. A sleeve of suitable material encases the outer perimeter of all the capacitor sections and prevents a potting compound from filling in between the intermediate ends of the capacitor sections. One end capacitor section of the stack is rigidly attached electrically and mechanically to a dome-shaped diaphragm of suitable material such that a depression of the dome isolates all the capacitor sections from the current source. The assembled device is then placed in a can and a suitable potting material poured in so that the top and sides of the unit are sealed. The potting agent encapsulates the sleeve surrounding all the capacitor sections holding them fixed with respect to the dome. The diaphragm must be able to move relative to the fixed stacked of capacitor sections such that the maximum travel distance of the diaphragm results in breaking the electrical connection to the capacitor with no possible restrike after 48 hours, but the diaphragm and the capacitor sections must remain within the confines of the can or case.

In the preferred embodiment, the diaphragm is a domed metal disc to permit flexing under pressure, a side of the dome being connected or welded to one connecting tab and the assembly potted in polyurethane. When the pressure builds up within the device, the dome diaphragm goes from concave to convex, pulling away from the contact bridge.

BRIEF DESCRIPTION OF THE DRAWINGS

FIG. 1 is a cross-sectional view of a stacked cell dry metallized film AC capacitor with the pressure sensitive fault interrupter of the present invention in place.

DESCRIPTION OF THE PREFERRED EMBODIMENT

FIG. 1 illustrates a multisection dry metallized film AC motor start or motor run stacked cell capacitor 10. Capacitor 10 has a plastic case 12, a plastic cover 14 and contains a plurality of metallized film capacitor sections or rolls 16, each wound having a central core 18. Each capacitor section 16 has metallic contact bridges 20, 22 sprayed on opposite ends of the roll, each bridge making contact with only one of the two electrodes. Typically, lead wires 24, 26 are electrically and mechanically secured to these bridges. As explained below, one bridge is connected differently for the fault interrupter of the present invention. The individual capacitor sections are connected electrically in series by means of a connecting tab 24. In the preferred embodiment illustrated in FIG. 1, only two capacitor sections 16 are shown. It should be understood that more than two may be connected in a similar fashion.

The stacked arrangement of capacitor sections 16 shown in FIG. 1 illustrates that the individual capacitors are separated electrically and spatially with a core connector 29 fashioned such that an air gap 35 is left between the core 18 and the sleeve 31, between the intermediate ends of two adjacent capacitor sections 16, that is the bottom of an upper capacitor and the top of a lower adjacent capacitor section in the stack. The core connector 29 in turn has an orifice 33 which permits the flow of gases from the gap between two adjacent capacitor units to the hollow core of the multisection capacitor unit. The top of the core 18 is covered by a tape 34. The bottom of the core 18 has an air gap 37 which will be explained later. All the capacitor sections 16 are inserted in a sleeve 31 of suitable material positioned around the perimeter of the sections 16 to prevent a potting compound from filling in between the intermediate air gaps 35.

FIG. 1 also shows the pressure sensitive fault interrupter of the present invention in operational condition installed in the multisection dry metallized AC capacitor. The purpose of the fault interrupter is to isolate the multisection capacitor from a power source when any capacitor section within it has developed a complete or partial short within its windings. During a fault, which is defined as a complete or partial short between the terminals of a capacitor section and internal to the capacitor roll, pressure is developed within the roll as a result of the breakdown of the dielectric, producing various gases. The gases are able to exit the roll at the ends of the roll only. The fault interrupter of the present invention utilizes pressure developed at one end of any individual capacitor section to cause the fault interrupter to be activated. A diaphragm 30 of suitable size and material, and having a domed shape, is rigidly attached to the contact bridge 22 at the base of the lowermost capacitor roll 16 in the stack, such that this diaphragm is in electrical contact with the schooped end of that capacitor section. The assembled device with sleeve 31 is then placed in a case and a suitable potting material, preferably polyurethane, is poured in so that the top and sides of the unit are sealed. Before the unit is potted, a tape 39 is positioned over the top of the core 18 to prevent potting compound from descending through the core of the multisection unit. The tape also provides a small void space to collect gases and direct the flow of these gases toward the diaphragm 30. Each core connector 29 connecting individual capacitor sections 16 within the unit also has an orifice 33 to permit the direction of gases from the bottom of any individual capacitor section 16 to the core 29. Consequently, when a fault occurs the gases will exert a downward and then inward pressure toward the core 18 and then downward within the core 18 toward diaphragm 30. The pressure on diaphragm 30 depresses it from a concave shape to a convex shape into air gap 37, thereby pulling it away from the bridge 22 on the bottom capacitor section 16. Thus, the pressure on the diaphragm 30 breaks the contact and electrically isolates the capacitor 10 from the current supply and stops further reaction with the device 10. Only one end of the capacitor stack has to be rigidly attached electrically and mechanically to the dome such that the deflection of the dome isolates all the capacitors from the power supply.

Thus, during a fault, pressure is developed within the roll as a result of the breakdown of the dielectric, producing various gases. The gases are able to exit each roll section, and its ends only, where they are directed through an orifice 33 in core connector 29 to the core 18. The fault interrupter utilizes pressure developed at one end of the multisection unit or any part thereof to depress the diaphragm located at one end of the capacitor and attached electrically and mechanically to the capacitor, so that the capacitor is isolated from the circuit means, thus preventing further action from the roll.

The pressure required to operate the fault interrupter of the present invention can be between 5 and 100 p.s.i. Each capacitor roll 16 can be from 0.75 inches to 3 inches in diameter. The diaphragm 30 can be made from aluminum or any other material that would provide the same action as described. The attachment of the diaphragm 30 to the roll 16 can be made by a connection by a wire or tab connection or by direct connection to the schooped end of the roll, bridge 22, of capacitor section 16.

The fault interrupter of the present invention differs significantly from and has many advantages over the prior art. It uses only normal, industry standard connections; no special connections are required. It is a simple external device. No special case is required. The case does not require a hermetic seal and the device work with fully encapsulated capacitor rolls without requiring case dimensions to change in order to interrupt a circuit.

We claim:

1. A multisection capacitor having a pressure sensitive fault interrupter, wherein said capacitor includes a plurality of metallized foil capacitor sections, each of said sections having an interior core void, a contact bridge formed at each end of each capacitor section to serve as the electrodes of said sections, a connecting tab to each of said contact bridges, a case, and potting material to secure said capacitor sections within said case, and connecting terminals for said tabs in a cover for said case, wherein said fault interrupter comprises:

means to attach and separate spatially each of said capacitor sections into a stack, providing an air gap between the bottom of one stacked capacitor section and the top of the adjacent lower capacitor section in said stack and having means to permit the passage of gases to the core of said stack;

means to connect electrically in series said capacitor sections within said stacked capacitor;

at least one sleeve circumferentially surrounding said stack of capacitor sections, at least in the area of said air gap;

means to cover the top of the core of the upper most roll in said stack;

a diaphragm electrically and mechanically attached to the base of the lowest capacitor section in said stack;

a conductive electrode tab connection running from said diaphragm to a terminal on the cover of said case;

a tab connected to the second of said terminals on said cover to the first of said capacitor sections in said stack;

a tab connecting each of the intermediate capacitor sections from the bottom of one section to the top of the adjacent lower section in said stack;

said capacitor sections within said sleeve and with said diaphragm connected thereto being positioned within said case;

potting material disposed around and above said capacitor sections within said case such that the top of said case is sealed and the sides of said case are filled with potting material between the case and said sleeve;

said diaphragm secured to the bottom of said stack of capacitor sections within said case such that said diaphragm may be depressed by gaseous pressure to break the electrical contact between the diaphragm and the contact bridge to which it is secured.

2. The capacitor of claim 1 wherein said means to attach and separate spatially said capacitor sections comprises:

at least one core connector of generally cylindrical shape positioned within the core of said multisection capacitor;

said core connector having an orifice permitting gases to escape from said air gap resulting from the spatial separation between said capacitor sections to said core void, said core connector being secured to the interior perimeter of each of said adjacent sections.

3. The capacitor of claim 1 wherein said diaphragm is dome shaped, having a concave shape in operational condition and a convex shape after depression.

4. The capacitor of claim 1 wherein said diaphragm is metallic.

5. The capacitor of claim 1 wherein said diaphragm is steel.

6. The capacitor of claim 1 wherein said potting material is polyurethane.

7. A multisection capacitor having a pressure sensitive fault interrupter, wherein said capacitor includes a plurality of metallized foil capacitor sections, each of said sections having an interior core void, a contact bridge formed at each end of each capacitor section to serve as the electrodes of said sections, a connecting tab to each of said contact bridges, a case, and potting material to secure said capacitor sections within said case, and connecting terminals for said tabs in a cover for said case, wherein said fault interrupter comprises:

at least one core connector of generally cylindrical shape positioned within the core of said multisection capacitor to attach and separate spatially each of said capacitor sections into a stack, providing an air gap between the bottom of one stacked capacitor section and the top of the adjacent lower capacitor section in said stack;

said core connector having an orifice permitting gases to escape from within the gap resulting from the spatial separation between said capacitor sections, said core connector being secured to the interior perimeter of each of said adjacent section;

means to connect electrically in series said capacitor sections within said stacked capacitor;

at least on sleeve circumferentially surrounding said stack of capacitor sections, at least in the area of said air gap;

means to cover the top of the core of the upper most roll in said stack;

a diaphragm electrically and mechanically attached to the base of the lowest capacitor section in said stack;

a conductive electrode tab connection running from said diaphragm to a terminal on the cover of said case;

a tab connected to the second of said terminals on said cover to the first of said capacitor sections in said stack;

a tab connecting each of the intermediate capacitor sections from the bottom of one section to the top of the adjacent lower section in said stack;

said capacitor sections within said sleeve and with said diaphragm connected thereto being positioned within said case;

potting material disposed around and above said capacitor sections within said case such that the top of said case is sealed and the sides of said case are filled with potting material between the case and said sleeve;

said diaphragm secured to the bottom of said stack of capacitor sections within said case such that said diaphragm may be depressed by gaseous pressure to break the electrical contact between the diaphragm and the contact bridge to which it is secured.

8. The capacitor of claim 7 wherein said diaphragm is dome shaped, having a concave shape in operational condition and a convex shape after depression.

9. The capacitor of claim 7 wherein said diaphragm is metallic.

10. The capacitor of claim 7 wherein said diaphragm is steel.

11. The capacitor of claim 7 wherein said potting material is polyurethane.

* * * * *